United States Patent
Lee et al.

(10) Patent No.: US 11,427,657 B2
(45) Date of Patent: Aug. 30, 2022

(54) SOLID CATALYST FOR PROPYLENE POLYMERIZATION AND METHOD OF PRODUCING BLOCK COPOLYMER USING THE SAME

(71) Applicant: HANWHA TOTAL PETROCHEMICAL CO., LTD., Seosan-si (KR)

(72) Inventors: Young Joo Lee, Suwon-si (KR); Eun Il Kim, Seosan-Si (KR); Hyeong Cheol Park, Seosan-si (KR); Su Min Ko, Gwacheon-si (KR)

(73) Assignee: HANWHA TOTAL PETROCHEMICAL CO., LTD., Seonsan-si (KR)

( * ) Notice: Subject to any disclaimer, the term of this patent is extended or adjusted under 35 U.S.C. 154(b) by 185 days.

(21) Appl. No.: 16/721,068

(22) Filed: Dec. 19, 2019

(65) Prior Publication Data

US 2020/0199266 A1 Jun. 25, 2020

(30) Foreign Application Priority Data

Dec. 20, 2018 (KR) ........................ 10-2018-0166543

(51) Int. Cl.
*C08F 10/06* (2006.01)
*C08F 297/08* (2006.01)

(52) U.S. Cl.
CPC .......... *C08F 10/06* (2013.01); *C08F 297/083* (2013.01); *C08F 2410/03* (2013.01); *C08F 2810/30* (2013.01)

(58) Field of Classification Search
CPC .......... C08F 10/06; C08F 4/654; C08F 4/6546
See application file for complete search history.

(56) References Cited

U.S. PATENT DOCUMENTS

| 2014/0315460 A1* | 10/2014 | Muramatsu | C09K 5/14 423/447.2 |
| 2016/0207836 A1* | 7/2016 | Land | C04B 35/5603 |

FOREIGN PATENT DOCUMENTS

| KR | 20130009453 A * | 1/2013 | ............ B63B 59/08 |
| KR | 101930165 B1 * | 12/2018 | |

* cited by examiner

*Primary Examiner* — Mark S Kaucher
(74) *Attorney, Agent, or Firm* — Harness, Dickey & Pierce, P.L.C.

(57) ABSTRACT

The present invention relates to a solid catalyst for propylene polymerization and a method of producing a propylene polymer or copolymer using the solid catalyst for propylene polymerization, and provides a solid catalyst which prepares a dialkoxymagnesium carrier and is formed of a carrier produced through a reaction of the carrier with a metal halide, a titanium halide, an organic electron donor, etc., and a method of producing a propylene polymer or copolymer through copolymerization of propylene-alpha olefin using the solid catalyst, wherein the dialkoxymagnesium carrier has an uniform particle size range of 10 to 100 μm and a spherical particle shape by adjusting injection amounts, injection numbers, and reaction temperatures of metal magnesium, alcohol and a reaction initiator during a reaction process of metal magnesium and alcohol.

5 Claims, No Drawings

SOLID CATALYST FOR PROPYLENE POLYMERIZATION AND METHOD OF PRODUCING BLOCK COPOLYMER USING THE SAME

CROSS-REFERENCE TO RELATED APPLICATION

This application claims the benefit and priority of Korean Patent Application No. 10-2018-0166543 filed Dec. 20, 2018. The entire disclosure of the above application is incorporated herein by reference.

FIELD

The present disclosure relates to a solid catalyst comprised of a carrier produced through a reaction process between dialkoxymagnesium and a metal halide, and a titanium halide, an organic electron donor, etc., and a method of producing a block copolymer using the solid catalyst, and more specifically, to a solid catalyst which not only can produce polypropylene having high activity, excellent stereoregularity and hydrogen reactivity, but also can produce a block copolymer having a high rubber content through copolymerization with alpha olefin when producing a propylene polymer using a Ziegler-Natta catalyst formed of such a solid catalyst system, and a method of producing a block copolymer using the solid catalyst.

BACKGROUND

This section provides background information related to the present disclosure which is not necessarily prior art.

Polypropylene, as material which is very usefully used in real life or commercially, has been widely used particularly from household goods such as a food container and the like to vehicles, electronic goods, etc. It is important to improve rigidity through high crystallinity in order to obtain various product performances of such polypropylene. Meanwhile, impact strength additionally required in automotive interior and exterior materials and others can be satisfied by producing a propylene-based block copolymer having a high rubber content. For this, a role of a polymerization catalyst is desperately needed above all. Namely, design of a catalyst system should be accompanied with improve stereoregularity of a polymer produced and satisfy high copolymerization properties with alpha olefin. Further, the higher polymerization activity of a catalyst is, the more it is favorable in the aspect of economic efficiency of polymer production.

On the other hand, a catalyst system used in gas phase polymerization, slurry polymerization and bulk polymerization of propylene is generally comprised of a Ziegler-Natta based catalyst component, alkylaluminum and an external electron donor. Particularly, such a catalyst component has been known as a solid catalyst containing magnesium, titanium, the internal electron donor and halogen as essential components. Particularly, the internal electron donor has been known to have a considerable impact on activity, stereoregularity and others of the catalyst according to molecular structure. Using diester of an aromatic dicarboxylic acid as the internal electron donor to improve physical properties of a polymer by lowering production costs through an increase in catalytic activities and improving catalyst performance such as stereoregularity or the like is a method which has been universally widely known, and patents related to the method have been applied. U.S. Pat. Nos. 4,562,173, 4,981,930, Korean Patent No. 0072844, and others may be examples of the method, and the patents introduce a method of preparing a catalyst expressing high activity and high stereoregularity using aromatic dialkyldiester or aromatic monoalkylmonoester.

The method of the above-mentioned patents is a method which is not sufficiently satisfied in obtaining a high stereoregularity polymer in high yield and of which improvement is required.

Korean Patent No. 0491387 discloses a catalyst preparation method using a diether material that is non-aromatic as the internal electron donor, and Korean Patent No. 0572616 discloses a catalyst preparation method using material which is non-aromatic and has ketone and an ether functional group at the same time as the internal electron donor. However, these two methods have some rooms for great improvements in both aspects of activity and stereoregularity.

Further, although United States Patent No. 2011/0040051 suggests a method of preparing a catalyst using a mixture of diethyl 2,3-diisopropyl-2-cyanosuccinate and 9,9-bis-methoxyfluorene as the internal electron donor, the method requires improvement since the method is very inferior in both aspects of activity and stereoregularity.

SUMMARY

This section provides a general summary of the disclosure, and is not a comprehensive disclosure of its full scope or all of its features.

The purpose of the present invention for solving the foregoing problems of conventional techniques is to provide a solid catalyst which not only can produce polypropylene having high stereoregularity and excellent activity and hydrogen reactivity, but also can produce a block copolymer having a high rubber content through copolymerization with alpha olefin, and a method of producing a propylene copolymer using the solid catalyst.

A method of preparing a solid catalyst for propylene polymerization of the present invention comprises the following steps:

(1) reacting dialkoxymagnesium with a metal halide compound at a relatively low reaction temperature in the presence of an organic solvent;

(2) reacting two or more types of the internal electron donors with the reaction product while increasing a reaction temperature after performing a dialkoxymagnesium reaction process of the step (1) to obtain a reaction product; and (3) reacting the reaction product of the step (2) with a titanium halide at high temperatures.

A method of preparing the above-specified solid catalyst comprises reacting dialkoxymagnesium used in the step (1) with metal magnesium, alcohol and a reaction initiator, wherein alcohol is divisionally added to metal magnesium 3 to 6 times in an amount corresponding to a ratio of metal magnesium weight (g):alcohol volume (ml) being 1:5 to 1:100, the reaction initiator is injected into a reaction system when starting an initial reaction process, and the reaction initiator is divisionally added to the reaction system 2 to 5 times as necessary during an additional reaction process.

Although shape of metal magnesium particles used during preparation of the solid catalyst for propylene polymerization of the present invention is not greatly limited, the shape of the metal magnesium particles is preferably a powder form having an average particle diameter of 10 to 500 μm, more preferably 50 to 300 μm. An average particle size of a carrier that is a product becomes so fine when metal magnesium has an average particle diameter of less than 10 μm, while it is difficult to have a uniform particle shape during preparation of a catalyst accordingly since the average particle size of the carrier becomes too large, and it is difficult to obtain an evenly spherical shaped carrier when metal magnesium has an average particle diameter of more than 500 μm.

For example, one or more of alcohols selected from aliphatic alcohols represented by general formula ROH (where, R is an alkyl group having 1 to 6 carbon atoms) such as methanol, ethanol, n-propanol, isopropanol, n-butanol, isobutanol, n-pentanol, isopentanol, neopentanol, cyclopentanol, cyclohexanol, etc, and aromatic alcohols such as phenol as the alcohol may be preferably used alone or in combination, one or more alcohols selected from methanol, ethanol, propanol and butanol as the alcohol may be more preferably used alone or in combination, and ethanol as the alcohol may be most preferably used.

A use ratio of alcohol to metal magnesium is preferably 1:5 to 1:100 as metal magnesium weight (g):alcohol volume (ml), more preferably 1:10 to 1:50. It is difficult to conduct a uniform stirring operation since viscosity of a slurry is rapidly increased when the use ratio is less than 1:5, while there is a problem that particle surfaces of the carrier produced are roughened, or particles are not formed when the use ratio is more than 1:100.

A reaction initiator used in reaction of metal magnesium and alcohol may include a nitrogen halogen compound.

Although the nitrogen halogen compound which may be used as the reaction initiator is not particularly limited, the nitrogen halogen compound may include one or more compounds selected from the group consisting of the following general formulas (1) to (4):

(1) N-halide Succinimide Based Compound

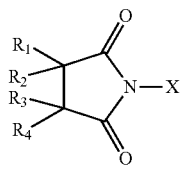
(1)

In general formula (1) which is an N-halide succinimide based compound, X is a halogen, and $R_1$, $R_2$, $R_3$ and $R_4$ are hydrogen, a $C_1$-$C_{12}$ alkyl, or a $C_6$-$C_{20}$ aryl.

(2) Trihaloisocyanuric Acid-Based Compound

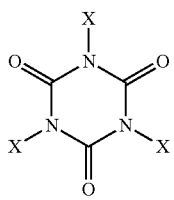
(2)

In general formula (2) which is a trihaloisocyanuric acid-based compound, X is a halogen.

(3) N-Halophthalimide Based Compound

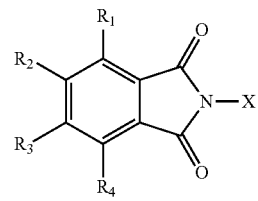
(3)

In general formula (3) which is an N-halophthalimide based compound, X is a halogen, and $R_1$, $R_2$, $R_3$ and $R_4$ are hydrogen, an $C_1$-$C_{12}$ alkyl, or a $C_6$-$C_{20}$ aryl.

(4) Hydantoin-Based Compound

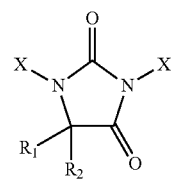
(4)

In general formula (4) which is a hydantoin-based compound, X is a halogen, and $R_1$ and $R_2$ are hydrogen, a $C_1$-$C_{12}$ alkyl, or a $C_6$-$C_{20}$ aryl.

On the other hand, a halogen compound or a magnesium halide compound may be used as the reaction initiator. Specific examples of the halogen compound may include compounds including $Br_2$, $I_2$, etc., and specific examples of the magnesium halide compound may include $MgCl_2$, $MgBr_2$, $MgI_2$, etc.

The reaction initiator is preferably used in an amount of 0.001 to 0.2 part by weight with respect to 1 part by weight of the total metal magnesium used. Reaction rate becomes too slow when the reaction initiator is used in an amount of less than 0.001 part by weight, while particle size of the product becomes too large, or fine particles may be produced in a large quantity when the reaction initiator is used in an amount of more than 0.2 part by weight.

In a method of producing a carrier of the present invention, alcohol may be divisionally added to metal magnesium 3 to 6 times in a reaction of alcohol with metal magnesium, and it is preferable that the reaction initiator is divisionally added to the reaction system 2 to 5 times as necessary during a reaction process after injecting the reaction initiator into a reaction system when starting an initial reaction process. When alcohol is divisionally added to metal magnesium two times or less, or the reaction initiator is injected into the reaction system two times or less, there are limitations to control particle sizes of metal magnesium, it is difficult to form spherical particles of metal magnesium, and there is a disadvantage that apparent density of the carrier is reduced.

In addition, a reduction in apparent density of the carrier is alleviated, and production of fine particles may be prevented at the same time by divisionally injecting alcohol two or more times during divisional injection of alcohol.

Further, stirring rate is preferably 50 to 300 rpm, more preferably 70 to 250 rpm during the reaction process. When the stirring rate is too slow or fast, there is a disadvantage that particles are not uniform.

Further, the reaction process of metal magnesium and alcohol is preferably performed at a temperature of 25 to 110° C., more preferably 50 to 100° C. in the presence of the reaction initiator. Thereafter, an aging treatment process is preferably performed at a temperature of 60 to 110° C. The reaction process may be performed while performing a cooling reflux process at a boiling point temperature of alcohol. When the reaction temperature and the aging treatment temperature are deviated from the above-mentioned temperature ranges, the reaction rate becomes very slow at a temperature of 50° C. or less, and a reaction occurs very rapidly at a temperature of more than 110° C. Accordingly, the reaction temperature and the aging treatment temperature are not desirable since fine particles may be produced, and an agglomeration phenomenon between the particles may occur.

Meanwhile, dialkoxymagnesium produced by the foregoing method preferably has a bulk specific gravity of 0.20 to 0.40 g/ml, more preferably 0.20 to 0.30 g/ml. It may be difficult to form particles, fine powder content is increased, and it is impossible to obtain a high stereoregularity polyolefin in high yield when the bulk specific gravity is less than 0.20 g/ml. Meanwhile, when the bulk specific gravity is more than 0.40 g/ml, dialkoxymagnesium has an undesirable impact on particle properties of produced polyolefin. Further, dialkoxymagnesium preferably has a pore volume range of 0.01 to 0.1 ml/g, more preferably 0.01 to 0.06 ml/g, and further more preferably 0.015 to 0.05 ml/g. When a solid catalyst component prepared using porous dialkoxymagnesium having the above-mentioned relatively small specific pore volume range is used in the polymerization of olefins, a polymer having high stereoregularity and excellent particle properties is obtained in high yield. Further, it is possible to obtain a copolymer with excellent particle properties in high yield even when a production ratio of a rubber phase polymer is high in block copolymerization.

Types of the organic solvent used in the step (1) are not particularly limited, and examples of the organic solvent may include $C_6$-$C_{12}$ aliphatic hydrocarbons, aromatic hydrocarbons, halogenated hydrocarbons, etc., more preferably $C_7$-$C_{10}$ saturated aliphatic hydrocarbons, aromatic hydrocarbons, and halogenated hydrocarbons. Specific examples of the organic solvent may include a mixture of one or more selected from heptane, octane, nonane, decane, toluene, xylene, chlorohexane, chloroheptane, etc.

Namely, a catalyst comprising the produced dialkoxymagnesium, titanium, halogen, and an internal electron donor formed of a nonaromatic alkoxyester-based compound as a first internal electron donor and phthalic acid ester or 1,3-diethers as a second internal electron donor is prepared.

A use ratio of the organic solvent to dialkoxymagnesium is preferably 1:5 to 1:50, more preferably 1:7 to 1:20 as a ratio of a dialkoxymagnesium weight to an organic solvent volume. It is difficult to uniformly stir the slurry since viscosity of a slurry is rapidly increased when the use ratio is less than 1:5, while the use ratio is not desirable since there is a problem that apparent density of a carrier produced is rapidly decreased, or particles of the carrier have rough surfaces when the use ratio is more than 1:50.

A titanium halide is used as a metal halide used in the solid catalyst preparation process and may be represented by the following general formula (I):

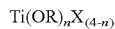  (I)

wherein, R is an alkyl group having 1 to 10 carbon atoms, X indicates a halogen element, and n, which is for adjusting valence of general formula, is an integer of 0 to 3. Specific examples of the titanium halide may include $TiCl_4$, $Ti(OCH_3)Cl_3$, $Ti(OC_2H_5)Cl_3$, $Ti(OC_3H_7)Cl_3$, $Ti(O(n-C_4H_9))Cl_3$, $Ti(OCH_3)_2Cl_2$, $Ti(OC_2H_5)_2Cl_2$, $Ti(OC_3H_7)_2Cl_2$, $Ti(O(n-C_4H_9))_2Cl_2$, $Ti(OCH_3)_3Cl$, $Ti(OC_2H_5)_3Cl$, $Ti(OC_3H_7)_3Cl$, $Ti(O(n-C_4H_9))_3Cl$, etc. $TiCl_4$ among them is preferably used as the titanium halide. Further, the specific examples of the titanium halide may include one of these tetravalent titanium halide compounds or a combination of two or more thereof. The reaction temperature of the step (1) is −10 to 60° C.

The first internal electron donor of two or more types of internal electron donors shown in the step (2) is a nonaromatic alkoxy ester-based compound represented by the following general formulas (II).

  (II)

B in general formula (II) indicates a compound of a mono ester structure consisting of aliphatic saturated hydrocarbons having 1 to 20 carbon atoms and cyclic saturated hydrocarbons having 1 to 20 carbon atoms or a compound of a carbamate structure consisting of an amino group and a linear or cyclic amino group. $R_1$ is a linear alkyl group having 1 to 12 carbon atoms, and $R_2$, $R_3$, $R_4$ and $R_5$ are each independently hydrogen, a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms, more preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, particularly preferably a linear alkyl group having 1 to 12 carbon atoms, a branched alkyl group having 3 to 12 carbon atoms, and a cyclic hydrocarbon group having 6 to 12 carbon atoms.

Specific examples thereof may include 2-methoxyethyl acetate, 2-methoxyethylpropionate, 2-methoxyethyl isobutylate, 2-methoxyethyl pivalate, 2-methoxyethyl pentanoate, 2-methoxyethyl 3-methylbutanoate, 2-methoxyethyl 2,3-dimethylbutanoate, 2-methoxyethyl 3,3-dimethylbutanoate, 2-methoxyethyl 2,3,3-trimethylbutanoate, 2-methoxyethyl 2,2,3,3-tetramethylbutanoate, 2-methoxyethyl 3-ethylbutanoate, 2-methoxyethyl 2,3-diethylbutanoate, 2-methoxyethyl 3,3-diethylbutanoate, 2-methoxyethyl 2,3,3-triethylbutanoate, 2-methoxyethyl 2,2,3,3-tetraethylbutanoate, 2-methoxyethyl 2-ethyl-3-methylbutanoate, 2-methoxyethyl 3-ethyl-3-methylbutanoate, 2-methoxyethyl 2-ethyl-3,3-dimethylbutanoate, 2-methoxyethyl 2,2,3,3-tetramethylbutanoate, 2-methoxyethyl 2-methylpentanoate, 2-methoxyethyl 3-methylpentanoate, 2-methoxyethyl 4-methylpentanoate, 2-methoxyethyl 2,3-dimethylpentanoate, 2-methoxyethyl 2,2-dimethylpentanoate, 2-methoxyethyl 3,3-dimethylpentanoate, 2-methoxyethyl 4,4-dimethylpentanoate, 2-methoxyethyl 2,4-dimethylpentanoate, 2-methoxyethyl 3,4-dimethylpentanoate, 2-methoxyethyl 3,3,4-trimethylpentanoate, 2-methoxyethyl 2,3,3-trimethylpentanoate, 2-methoxyethyl 2,2,3-trimethylpentanoate, 2-methoxyethyl 2,3,4-trimethylpentanoate, 2-methoxyethyl 2,3,3-trimethylpentanoate, 2-methoxyethyl 2,2,3,3-tetramethylpentanoate, 2-methoxyethyl 3-ethylpentanoate, 2-methoxyethyl 2,3-diethylpentanoate, 2-methoxyethyl 3,3-diethylpentanoate, 2-methoxyethyl 2,3,3-triethylpentanoate, 2-methoxyethyl 2,2,3,3-tetraethylpentanoate, 2-methoxyethyl 2-ethyl-3-methylpentanoate, 2-methoxyethyl 3-ethyl-3-methylpentanoate, 2-methoxyethyl 2-ethyl-3,3-dimethylpentanoate, 2-methoxyethyl 2,2,3,3-tetramethylpentanoate, 2-methoxyethyl cyclohexanecarboxylate, 2-methoxyethyl 2-methylcyclohexanecarboxylate, 2-methoxyethyl 3-methylcyclohexanecarboxylate, 2-methoxyethyl cyclohex-2-ene-carboxylate, 2-methoxyethyl cyclohex-2-ene-carboxylate, 2-methoxyethyl carbamate, 2-methoxyethyl methylcarbamate, 2-methoxyethyl ethylcarbamate, 2-methoxyethyl dimethylcarbamate, 2-methoxyethyl diethylcarbamate, 2-methoxyethyl piperidine-1-carboxylate, 2-methoxyethyl 2-methylpiperidine-1-carboxylate, 2-methoxyethyl 3-methylpiperidine-1-carboxylate, 2-methoxyethyl 2,3-dimethylpiperidine-1-carboxylate, 2-methoxyethyl 2,4-dimethylpiperidine-1-carboxylate, 2-methoxyethyl 2,5-dimethylpiperidine-1-carboxylate, 2-methoxyethyl 2,6-dimethylpiperidine-1-carboxylate, 2-ethoxyethyl acetate, 2-ethoxyethylpropionate, 2-ethoxyethyl butylate, 2-ethoxyethyl isobutylate, 2-methoxyethyl pivalate, 2-ethoxyethyl pentanoate, 2-ethoxyethyl 3-methylbutanoate, 2-ethoxyethyl 2,3-dimethylbutanoate, 2-ethoxyethyl 3,3-dimethylbutanoate, 2-ethoxyethyl 2,3,3-trimethylbutanoate, 2-ethoxyethyl 2,2,3,3-tetramethylbutanoate, 2-ethoxyethyl 3-ethylbutanoate, 2-ethoxyethyl 2,3-diethylbutanoate, 2-ethoxyethyl 3,3-diethylbutanoate, 2-ethoxyethyl 2,3,3-triethylbutanoate, 2-ethoxyethyl 2,2,3,3-tetraethylbutanoate, 2-ethoxyethyl 2-ethyl-3-methylbutanoate, 2-ethoxyethyl 3-ethyl-3-methylbutanoate, 2-ethoxyethyl 2-ethyl-3,3-dimethylbutanoate, 2-ethoxyethyl 2,2,3,3-tetramethylbutanoate, 2-ethoxyethyl 2-methylpentanoate, 2-ethoxyethyl 3-methylpentanoate, 2-ethoxyethyl 4-methylpentanoate, 2-ethoxyethyl 2,3-dimethylpentanoate, 2-ethoxyethyl 2,2-dimethylpentanoate, 2-ethoxyethyl 3,3-dimethylpentanoate, 2-ethoxyethyl 4,4-dimethylpentanoate, 2-ethoxyethyl 2,4-dimethylpentanoate, 2-ethoxyethyl 3,4-dimethylpentanoate, 2-ethoxyethyl 3,3,4-trimethylpentanoate, 2-ethoxyethyl 2,3,3-trimethylpentanoate, 2-ethoxyethyl 2,2,3-trimethylpentanoate, 2-ethoxyethyl 2,3,4-trimethylpentanoate, 2-ethoxyethyl 2,3,3-trimethylpentanoate, 2-ethoxyethyl 2,2,3,3-tetramethylpentanoate, 2-ethoxyethyl 3-ethylpentanoate, 2-ethoxyethyl 2,3-diethylpentanoate, 2-ethoxyethyl 3,3-diethylpentanoate, 2-ethoxyethyl 2,3,3-triethylpentanoate, 2-ethoxyethyl 2,2,3,3-tetraethylpentanoate, 2-ethoxyethyl 2-ethyl-3-methylpentanoate, 2-ethoxyethyl 3-ethyl-3-methylpentanoate, 2-ethoxyethyl 2-ethyl-3,3-dimethylpentanoate, 2-ethoxyethyl 2,2,3,3-tetramethylpentanoate, 2-ethoxyethyl cyclohexanecarboxylate, 2-ethoxyethyl 2-methylcyclohexanecarboxylate, 2-ethoxyethyl 3-methylcyclohexanecarboxylate, 2-ethoxyethyl cyclohex-2-ene-carboxylate, 2-ethoxyethyl cyclohex-2-ene-carboxylate, 2-ethoxyethyl carbamate, 2-ethoxyethyl methylcarbamate, 2-ethoxyethyl ethylcarbamate, 2-ethoxyethyl dimethylcarbamate, 2-ethoxyethyl diethylcarbamate, 2-ethoxyethyl piperidine-1-carboxylate, 2-ethoxyethyl 2-ethylpiperidine-1-carboxylate, 2-ethoxyethyl 3-ethylpiperidine-1-carboxylate, 2-ethoxyethyl 2,3-dimethylpiperidine-1-carboxylate, 2-ethoxyethyl 2,4-dimethylpiperidine-1-carboxylate, 2-ethoxyethyl 2,5-dimethylpiperidine-1-carboxylate, 2-ethoxyethyl 2,6-dimethylpiperidine-1-carboxylate, etc.

Meanwhile, the second internal electron donor is not particularly limited. Therefore, examples of the second internal electron donor may include without limitations compounds which can be used as an internal electron donor in the preparation of an olefin polymerizing Ziegler-type catalyst such as alcohols, ethers, ketones, carboxylic acids, etc., preferably carboxylic acid compounds, more preferably one selected from benzene-1,2-dicarboxylic acid ester compounds, or mixtures of two or more thereof. Specific examples of the benzene-1,2-dicarboxylic acid ester compounds may include dimethyl phthalate, diethyl phthalate, di-n-propyl phthalate, diisopropyl phthalate, di-n-butyl phthalate, diisobutyl phthalate, di-n-pentyl phthalate, di(2-methylbutyl)phthalate, di(3-methylbutyl)phthalate, di(3-methylpentyl)phthalate, diisohexyl phthalate, dineohexyl phthalate, di(2,3-dimethylbutyl)phthalate, diisohexyl phthalate, dineohexyl phthalate, di(2,3-dimethylbutyl)phthalate, di-n-heptyl phthalate, di(2-methylhexyl)phthalate, di(2-ethylpentyl)phthalate, diisoheptyl phthalate, dineoheptyl phthalate, di-n-octyl phthalate, di(2-methylheptyl)phthalate, diisooctyl phthalate, di(3-ethylhexyl)phthalate, dineooctyl phthalate, di-n-nonyl phthalate, diisononyl phthalate, di-n-decyl phthalate, diisodecyl phthalate, etc.

Meanwhile, it is more desirable that the second internal electron donor includes phthalic acid ester or 1,3-diethers, and it is also very desirable that the second internal electron donor includes a compound represented by a structure as in the following general formula (III):

$$R_6R_7C(CH_2OR_8)(CH_2OR_9) \quad (III)$$

wherein, the compound is 1,3-diethers in which: $R_6$ and $R_7$, which are the same as or different from each other, are an alkyl radical having 1 to 18 carbon atoms, a cycloalkyl radical having 3 to 18 carbon atoms, or an aryl radical having 7 to 18 carbon atoms; $R_8$ and $R_9$, which are the same as or different from each other, are an alkyl radical having 1 to 4 carbon atoms; and a carbon atom at the second position belongs to a cyclic or polycyclic containing 2 or 3 unsaturated hydrocarbons and consisting of 5, 6 or 7 carbon atoms.

It is desirable to perform the step (2) by injecting an internal electron donor during a temperature increasing process while slowly increasing the temperature of a resulting material produced in the step (1) to 60 to 150° C., preferably 80 to 130° C., thereby reacting the resulting material of the step (1) with the internal electron donor for a reaction time of 1 to 3 hours. It is difficult to complete the reaction process when the temperature is less than 60° C., or the reaction time is less than 1 hour, while polymerization activity of a catalyst that is a resulting material or stereoregularity of a polymer may be lowered by a side reaction when the temperature is more than 150° C., or the reaction time is more than 3 hours.

As long as the first and second internal electron donors are injected during the temperature increasing process, injection temperatures and injection numbers of the first and second internal electron donors are not greatly limited, and two or more of the internal electron donors that are different from each other may be simultaneously injected or may be injected at different temperatures. Although the total use amount of the two internal electron donors is not limited, it is preferable that the first internal electron donor is used in an amount range of 0.001 to 2.0 mol, and the second internal electron donor is used in the amount range of 0.001 to 2.0 mol as the total mol number of the two internal electron donors with respect to 1 mole of dialkoxymagnesium used. If use amounts of the two internal electron donors are deviated from the foregoing ranges, polymerization activity of the catalyst that is the resulting material or stereoregularity of the polymer may be lowered, and the total mol number of the two internal electron donors is not desirable even when producing a block copolymer with a high rubber content due to lowering of activities during a copolymerization process with ethylene.

The step (3) in a preparation process of the solid catalyst is a process of reacting a resulting material of the step (2) with a titanium halide two or more times at a temperature of 60 to 150° C., preferably 80 to 130° C. At this time, an example of the titanium halide used may include a titanium halide of the above-mentioned general formula (I).

It is desirable in the preparation method of the solid catalyst that a reaction process in each of the steps is performed within a reactor having a stirrer mounted thereon in a nitrogen gas atmosphere after sufficiently removing moisture or the like from the stirrer.

The solid catalyst of the present invention prepared by the foregoing method comprises magnesium, titanium, a halogen compound, and alkoxy ester, phthalic acid ester or 1,3-diester forms as two or more types of internal electron donors. When considering the aspect of catalytic activity, it is desirable that the solid catalyst is formed by comprising 5 to 40 wt % of metal magnesium, 0.5 to 10 wt % of titanium, 50 to 85 wt % of the halogen, 0.01 to 20 wt % of a first internal electron donor, and 0.1 to 20 wt % of a second internal electron donor.

On the other hand, the solid catalyst of the present invention has a feature that particles of the solid catalyst have a small pore volume, i.e., relatively large pores having a diameter of 100 Å or more are less distributed in the solid catalyst particles, while fine pores having a diameter of 100 Å or less are undispersed in the solid catalyst particles. Further, fine primary particles are aggregated to form secondary particles, and the primary particles have an average diameter of 0.01 to 0.1 μm in the solid catalyst particles. It is difficult to form particles, or a fine powder content is increased due to a decrease in strength of the particles when the pores have a diameter of 100 Å or more, while instability of a polymerization process may be caused since copolymerization properties are lowered, or stickiness on the surface of a copolymer is increased when the primary particles have a diameter of 0.01 μm or less. Further, it is difficult to adjust size and shape of the particles, and an increase in the fine powder content may occur when the primary particles have a diameter of 0.1 μm or more.

A method of polymerizing or copolymerizing propylene using a solid catalyst prepared by a catalyst preparation method of the present invention comprises producing a propylene polymer or copolymer by copolymerizing propylene and ethylene, or propylene and other alpha olefin after polymerizing propylene in the presence of a cocatalyst and an external electron donor or polymerizing propylene alone using the solid catalyst. In the present invention, an alpha olefin used in copolymerization may include at least one olefin selected from alpha olefins having 2 to 20 carbon atoms (except for propylene having 3 carbon atoms), specific examples of the alpha olefin may include ethylene, 1-butene, 1-pentene, 4-methyl-1-pentene, vinyl cyclohexane, etc., and the alpha olefins may include one or more of alpha olefins. Ethylene and 1-butene among the specific examples of the alpha olefin are appropriate, and particularly ethylene is desirable.

The solid catalyst can be used by prepolymerizing the solid catalyst with ethylene or alpha olefin before using the solid catalyst as a component of a polymerization reaction process.

A prepolymerization reaction process may be performed at a sufficiently low temperature and an ethylene or alpha olefin pressure condition in the presence of a hydrocarbon solvent (e.g., hexane), the catalyst component and an organic aluminum compound (e.g., triethylaluminum). The prepolymerization reaction process may help to obtain a better shape of the polymer after the polymerization reaction process by surrounding particles of a catalyst with a polymer, thereby maintaining shape of the catalyst. A weight ratio of the polymer to the catalyst after the prepolymerization reaction process is preferably about 0.1:1 to 20:1.

In the method of polymerizing or copolymerizing propylene, examples of a cocatalyst component may include organometallic compounds of Group II or Group III in the periodic table. For example, alkylaluminum compounds may be preferably used as the cocatalyst component. The alkylaluminum compounds are represented by the following general formula (IV):

$$AlR_3 \tag{IV}$$

wherein, R is an alkyl group having 1 to 6 carbon atoms.

Specific examples of the alkylaluminum compounds may include trimethylaluminum, triethylaluminum, tripropylaluminum, tributylaluminum, triisobutylaluminum, trioctylaluminum, etc.

Although there are some differences in ratios of the cocatalyst component to the solid catalyst component according to polymerization methods, a molar ratio of a metal atom in the cocatalyst component to titanium atom in the solid catalyst component is preferably in a range of 1 to 1,000, more preferably 10 to 300. If a molar ratio of the metal atom, e.g., aluminum atom in the cocatalyst component to titanium atom in the solid catalyst component is deviated from the range of 1 to 1,000, there is a problem that polymerization activity is greatly lowered.

In the method of polymerizing or copolymerizing propylene, examples of the external electron donor may include one or mixtures of two or more of alkoxysilane compounds represented by the following general formula (V):

$$R^1_m R^2_n Si(OR^3)_{(4-m-n)} \tag{V}$$

wherein, $R^1$ and $R^2$, which may be the same as or different from each other, are a linear, branched or cyclic alkyl group or aryl group having 1 to 12 carbon atoms, $R^3$ is a linear or branched alkyl group having 1 to 6 carbon atoms, m and n are each 0 or 1, and m+n is 1 or 2.

Specific examples of the external electron donor may include n-propyltrimethoxysilane, di-n-propyldimethoxysilane, isopropyltrimethoxysilane, diisopropyldimethoxysilane, n-butyltrimethoxysilane, di-n-butyldimethoxysilane, isobutyltrimethoxysilane, diisobutyldimethoxysilane, t-butyltrimethoxysilane, di-t-butyldimethoxysilane, n-pentyltrimethoxysilane, di-n-pentyldimethoxysilane, cyclopentyltrimethoxysilane, dicyclopentyldimethoxysilane, cyclopentylmethyldimethoxysilane, cyclopentylethyldimethoxysilane, cyclopentylpropyldimethoxysilane, cyclohexyltrimethoxysilane, dicyclohexyldimethoxysilane, cyclohexylmethyldimethoxysilane, cyclohexylethyldimethoxysilane, cyclohexylpropyldimethoxysilane, cycloheptyltrimethoxysilane, dicycloheptyldimethoxysilane, cycloheptylmethyldimethoxysilane, cycloheptylethyldimethoxysilane, cycloheptylpropyldimethoxysilane, phenyltrimethoxysilane, diphenyldimethoxysilane, phenylmethyldimethoxysilane, phenylethyldimethoxysilane, phenylpropyldimethoxysilane, n-propyltriethoxysilane, di-n-propyldiethoxysilane, isopropyltriethoxysilane, diisopropyldiethoxysilane, n-butyltriethoxysilane, di-n-butyldiethoxysilane, isobutyltriethoxysilane, diisobutyldiethoxysilane, t-butyltriethoxysilane, di-t-butyldiethoxysilane, n-pentyltriethoxysilane, di-n-pentyldiethoxysilane, cyclopentyltriethoxysilane, dicyclopentyldiethoxysilane, cyclopentylmethyldiethoxysilane, cyclopentylethyldiethoxysilane, cyclopentylpropyldiethoxysilane, cyclohexyltriethoxysilane, dicyclohexyldiethoxysilane, cyclohexylmethyldiethoxysilane, cyclohexylethyldiethoxysilane, cyclohexylpropyldiethoxysilane, cycloheptyltriethoxysilane, dicycloheptyldiethoxysilane, cycloheptylmethyldiethoxysilane, cycloheptylethyldiethoxysilane, cycloheptylpropyldiethoxysilane, phenyltriethoxysilane, diphenyldiethoxysilane, phenylmethyldiethoxysilane, phenylethyldiethoxysilane, phenylpropyldiethoxysilane, etc. One or more of the specific examples of the external electron donor may be used alone or in a combination.

Although there are some differences in use amounts of the external electron donor to the solid catalyst according to polymerization methods, a molar ratio of silicon atom in the external electron donor to titanium atom in the catalyst component is preferably in a range of 0.1 to 500, more preferably 1 to 100. The molar ratio is not desirable since stereoregularity of a propylene polymer produced is remarkably lowered if a molar ratio of silicon atom in the external electron donor to titanium atom in the solid catalyst component is less than 0.1, while there is a problem that polymerization activity of the catalyst is remarkably lowered if the molar ratio is more than 500.

A polymerization reaction temperature in the propylene polymerizing or copolymerizing method is desirably 20 to 120° C. The polymerization reaction temperature is not desirable since a reaction process is not sufficiently progressed when the polymerization reaction temperature is less than 20° C., while the polymerization reaction temperature is not desirable since the polymerization reaction temperature not only deteriorates polymerization activity severely, but also adversely affects physical properties of a polymer when the polymerization reaction temperature is more than 120° C.

The present invention relates to a preparation method of a solid catalyst for producing polypropylene, and provides a preparation method of a solid catalyst formed of dialkoxymagnesium in which injection amounts, injection numbers, reaction temperatures, bulk specific gravities, pore volumes and the like of metal magnesium, alcohol and a reaction initiator are adjusted, a titanium halide as a metal halide, a combination of first and second internal electron donors, etc., and a method of producing polypropylene using the solid catalyst. Particularly, a solid catalyst prepared using a dialkoxymagnesium carrier used in the present invention not only can produce polypropylene which can be applied to various types of propylene polymerization processes including a slurry polymerization process, a bulk polymerization process, a gas phase polymerization process, etc., has high activity and excellent stereoregularity, and is excellent in hydrogen reactivity, but also can produce a block copolymer having a high rubber content and excellent particle properties in high yield through copolymerization with an alpha olefin.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

Hereinafter, Examples and Comparative Examples of the present invention will be described in detail. However, the present invention is not limited thereto.

EXAMPLE 1

[Preparation of a Spherical Carrier]

After sufficiently ventilating a 5 L-sized glass reactor having a stirrer, an oil heater and a cooling refluxer mounted thereon with nitrogen, 4 g of N-bromosuccinimide, 40 g of metal magnesium (a powder-type product having an average particle diameter of 100 μm) and 500 ml of anhydrous ethanol were injected into the reactor, and then temperature of the reactor was maintained to 60° C. while operating the reactor at a stirring rate of 250 rpm. Since hydrogen was generated while a reaction process was being started with the passage of about 10 minutes, pressure of the reactor was maintained at atmospheric pressure in a state that an outlet of the reactor was opened so as to discharge the hydrogen generated. After completing the generation of hydrogen, the reactor was maintained at 60° C. for 1 hour. After injecting 20 g of metal magnesium (a powder-type product having an average particle diameter of 100 μm) along with 300 ml of anhydrous ethanol and 2 g of a reaction initiator into the reactor with the passage of 1 hour, maintaining the reactor for 1 hour, and finally injecting 10 g of metal magnesium (a powder-type product having an average particle diameter of 100 μm), 200 ml of anhydrous ethanol and 1 g of the reaction initiator into the reactor, an aging treatment operation was conducted for 3 hours until a reaction process was terminated. After finishing the aging treatment operation, a resulting material was washed at 50° C. three times using 2,000 ml of n-hexane per time. 263 g of a diethoxymagnesium carrier with a yield of 93.2% as a white powder-type solid product with good flowability was obtained by drying a washed resulting material in the presence of a flowing nitrogen for 24 hours.

As a result of measuring particle sizes of a dried product by a light transmission method using a laser particle analyzer (Mastersizer X manufactured by Malvern Instruments Corporation), an average particle size of the dried product was 25.2 μm.

Particle distribution index (P) ($P=(D_{90}-D_{10})/D_{50}$, where $D_{90}$ is a particle size corresponding to a cumulative weight 90%, $D_{50}$ is a particle size corresponding to a cumulative weight 50%, and $D_{10}$ is a particle size corresponding to a cumulative weight 10%) was 0.71, and an apparent density measured in accordance with ASTM D1895 was 0.24 g/cc.

[Preparation of a Solid Catalyst Component]

After injecting 112 ml of toluene and 15 g of diethoxymagnesium having an average particle diameter of 20 μm, a spherical shape, a particle size distribution index of 0.86 and an apparent density of 0.35 g/cc into a glass reactor which was sufficiently substituted with nitrogen and in which an one liter-sized stirrer was installed, and injecting a diluted solution obtained by diluting 20 ml of titanium tetrachloride into 30 ml of toluene into the reactor over 1 hour while maintaining the reactor at 10° C., 2.8 g of 2-ethoxyethyl butanoate, 1.5 g of 2-isobutyl-2-isopropyl-1,3-dimethoxypropane, and 1.0 g of diisobutylphthalate were sequentially injected into the reactor while heating the reactor to a temperature of 100° C. After maintaining the reactor at 100° C. for 2 hours, lowering temperature of the reactor to 90° C., and stopping a stirring operation, a supernatant was removed, and a resulting material was further washed with 200 ml of toluene one time. A process of injecting 120 ml of toluene and 20 ml of titanium tetrachloride into the reactor, increasing temperature of the reactor to 100° C., and maintaining the reactor at 100° C. for 2 hours was repeatedly performed one time to obtain an aging process-completed slurry mixture. A pale yellow solid catalyst component was obtained by washing the aging process-completed slurry mixture two times with 200 ml of toluene per one time and washing a washed resulting material at 40° C. five times with 200 ml of n-hexane per one time. A solid catalyst component obtained by drying the pale yellow solid catalyst component in flowing nitrogen for 18 hours had a titanium content of 2.0 wt %.

[Polypropylene Polymerization]

10 mg of the solid catalyst, 10 mmol of triethyl aluminum and 1 mmol of dicyclopentylmethyldimethoxysilane were injected into a 4 liter-sized stainless steel reactor for high pressure. Subsequently, a polymerization process was performed by increasing temperature of the reactor to 70° C. after sequentially injecting 7,000 ml of hydrogen and 2.4 L of propylene of a liquid state into the reactor. Propylene within the reactor was completely deaerated to obtain a polymer by opening a valve while lowering the temperature of the reactor to room temperature when 2 hours were elapsed after initiating the polymerization process.

After analyzing the polymer obtained, analysis results of the polymer are represented in Table 1.

Here, catalytic activity, stereoregularity, melt-flowability and polydispersity index were determined by the following methods.

① Catalytic activity (kg-PP/g-cat)=a production amount of polymer (kg)÷amount of catalyst (g)

② Stereoregularity (X.I.): wt % of an insoluble component obtained after being crystallized and precipitated in a mixed xylene ③ Melt-flowability (MI, g/10 minutes): a value measured at a temperature of 230° C. and a load of 2.16 kg in accordance with ASTM1238

④ Polydispersity index (PI): a value calculated using the following calculation formula from a modulus separation value obtained using a parallel plate rheometer at a temperature of 200° C.

P.I.=54.6*(modulus separation)−1.76

[Propylene-Based Block Copolymerization]

After putting 5 mg of the solid catalyst into a stirrer-attached stainless steel reactor with a 2 L size filled with nitrogen, injecting 3 mmol of triethylaluminum and 0.3 mmol of dicyclopentyldimethoxysilane (DCPDMS) into the reactor, and then injecting 1.2 L of liquefied propylene and 5,000 ml of hydrogen into the reactor, thereby performing a preliminary polymerization process at 20° C. for 5 minutes, a propylene homopolymerization process was performed at 70° C. for 40 minutes. After finishing the homopolymerization process, purging a monomer while lowering temperature of the reactor to room temperature, injecting a mixed gas to be a molar ratio of ethylene/(ethylene+propylene) of 0.4 into the reactor, and increasing temperature of the reactor to 70° C., thereby performing a polymerization process for 60 minutes, a propylene-based block copolymer could be obtained. After analyzing the propylene-based block copolymer obtained, analysis results of the propylene-based block copolymer are represented in Table 2.

① Block copolymer activity (ICP activity, kg-PP/g-cat)=a production amount of polymer (kg)÷amount of catalyst (g)

② Rubber content of ethylene propylene (EPR, wt %): wt % of a component obtained by precipitating a xylene-removed copolymer after removing xylene from the copolymer by extracting a copolymer with xylene ③ Ethylene content in a copolymer (B-C2, wt %): ethylene content obtained after sampling a copolymer and measuring the sampled copolymer by Fourier Transform Infrared Spectrometer (FT-IR) (the ethylene content is calculated based on a calibration curve drawn up by a standard sample)

Ethylene content in EPR (PER-C2, wt %): (ethylene content in the copolymer)/(rubber content of ethylene propylene)*100

EXAMPLE 2

[Preparation of a Spherical Carrier]

After sufficiently ventilating a 5 L-sized glass reactor having a stirrer, an oil heater and a cooling refluxer mounted thereon with nitrogen, 3 g of N-bromosuccinimide, 10 g of metal magnesium (a powder-type product having an average particle diameter of 120 μm) and 300 ml of anhydrous ethanol were injected into the reactor, and then temperature of the reactor was maintained to 70° C. that was an ethanol reflux state while operating the reactor at a stirring rate of 250 rpm. Since hydrogen was generated while a reaction process was being started with the passage of about 5 minutes, pressure of the reactor was maintained at atmospheric pressure in a state that an outlet of the reactor was opened so as to discharge generated hydrogen. After the generation of hydrogen, 1 g of N-bromosuccinimide, 20 g of metal magnesium (a powder-type product having an average particle diameter of 120 μm) and 250 ml of ethanol were additionally injected into the reactor. After finishing hydrogen generation caused by a reaction process between metal magnesium and ethanol due to the secondary additional injection process, an aging treatment process was performed by additionally thirdly injecting 3 g of N-bromosuccinimide, 450 g of metal magnesium (a powder-type product having an average particle diameter of 120 μm) and 560 ml of ethanol into the reactor, and maintaining a reactor temperature and a stirring rate in a reflux state for 2 hours. After finishing the aging treatment process, a resulting material was washed at 50° C. three times using 2,000 ml of n-hexane per one time of a washing process. 336 g of a diethoxymagnesium carrier with a yield of 95.2% as a white powder-type solid product with good flowability was obtained by drying a washed resulting material in the presence of a flowing nitrogen for 24 hours.

As results of measuring by the same methods as in Example 1, the dried carrier suspended in n-hexane had the average particle size of 32.1 μm, the particle distribution index of 0.89, and the apparent density of 0.27 g/cc.

[Preparation of a Solid Catalyst Component]

After sequentially injecting a solution prepared by mixing 1.0 g of 2-isopentyl-2-isopropyl-1,3-dimethoxypropane with 3 g of 2-methoxyethyl pivalate instead of 2-ethoxyethyl butylate and 2.0 g of diisobutylphthalate into a reactor in the preparation of a solid catalyst of Example 1, the catalyst was prepared while increasing temperature of the reactor. A solid catalyst component had a titanium content of 2.1 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2.

EXAMPLE 3

[Preparation of a Spherical Carrier]

After sufficiently ventilating a 5 L-sized glass reactor having a stirrer, an oil heater and a cooling refluxer mounted thereon with nitrogen, 2 g of N-bromosuccinimide, 10 g of metal magnesium (a powder-type product having an average particle diameter of 120 μm) and 250 ml of anhydrous ethanol were injected into the reactor, and then temperature of the reactor was maintained to 80° C. that was an ethanol reflux state while operating the reactor at a stirring rate of 200 rpm. Since hydrogen was generated while a reaction process was being started with the passage of about 5 minutes, pressure of the reactor was maintained at atmospheric pressure in a state that an outlet of the reactor was opened so as to discharge generated hydrogen. After the generation of hydrogen, 3 g of N-bromosuccinimide, 30 g of metal magnesium (a powder-type product having an average particle diameter of 120 μm) and 450 ml of ethanol were additionally injected into the reactor. After finishing hydrogen generation caused by a reaction process between metal magnesium and ethanol due to the secondary additional injection process, an aging treatment process was performed by additionally thirdly injecting 2 g of N-bromosuccinimide, 20 g of metal magnesium (a powder-type product having an average particle diameter of 120 μm) and 300 ml of ethanol into the reactor, and maintaining a reactor temperature and a stirring rate in a reflux state for 2 hours. After finishing the aging treatment process, a resulting material was washed three times using 2,000 ml of n-hexane per one time of a washing process at 50° C. 271 g of a diethoxymagnesium carrier with a yield of 95.8% as a white powder-type solid product with good flowability was obtained by drying a washed resulting material in the presence of a flowing nitrogen for 24 hours.

As results of measuring by the same methods as in Example 1, the dried carrier suspended in n-hexane had the average particle size of 42.2 μm, the particle distribution index of 0.62, and the apparent density of 0.27 g/cc.

[Preparation of a Solid Catalyst Component]

After preparing a solid catalyst using the prepared spherical carrier by the same method as in Example 1, the solid catalyst was measured in the same manner as in Example. As a result of measurement, the solid catalyst had a titanium content of 2.33 wt %, and an average particle size of 45.2 μm. After performing a polypropylene polymerization process by the same method as in Example 1, results of the polypropylene polymerization process are represented in Table 1, and after producing a propylene-based block copolymer by the same method as in Example 1, production results are represented in Table 2.

EXAMPLE 4

[Preparation of a Spherical Carrier]

After sufficiently ventilating a 5 L-sized glass reactor having a stirrer, an oil heater and a cooling refluxer mounted thereon with nitrogen, 3.5 g of N-bromosuccinimide, 15 g of metal magnesium (a powder-type product having an average particle diameter of 150 μm) and 450 ml of anhydrous ethanol were injected into the reactor, and then an ethanol refluxing state was maintained by increasing temperature of the reactor to 85° C. while operating the reactor at a stirring rate of 150 rpm. Since hydrogen was generated while a reaction process was being started with the passage of about 5 minutes, pressure of the reactor was maintained at atmospheric pressure in a state that an outlet of the reactor was opened so as to discharge generated hydrogen. After the generation of hydrogen, 2.0 g of N-chlorosuccinimide, 20 g of metal magnesium (a powder-type product having an average particle diameter of 150 μm) and 300 ml of anhydrous ethanol were additionally injected into the reactor. After finishing hydrogen generation caused by a reaction process between metal magnesium and ethanol due to the secondary additional injection process, an aging treatment process was performed by additionally thirdly injecting 0.5 g of N-chlorosuccinimide, 27 g of metal magnesium (a powder-type product having an average particle diameter of 150 μm) and 375 ml of anhydrous ethanol into the reactor, and maintaining a reactor temperature and a stirring rate in a reflux state for 2 hours. After finishing the aging treatment process, a resulting material was washed three times using 2,000 ml of n-hexane per one time of a washing process at 50° C. 285 g of a diethoxymagnesium carrier with a yield of 97.6% as a white powder-type solid product with good flowability was obtained by drying a washed resulting material in the presence of a flowing nitrogen for 24 hours.

As results of measuring by the same methods as in Example 1, the dried carrier suspended in n-hexane had the average particle size of 61.4 μm, the particle distribution index of 0.83, and the apparent density of 0.26 g/cc.

[Preparation of a Solid Catalyst Component]

The catalyst was prepared by sequentially injecting 1.8 g of diisobutylphthalate and 1.5 g of 2-isopentyl-2-isopropyl-1,3-dimethoxypropane respectively into 2.8 g of 2-ethoxyethyl dimethylcarbamate instead of 2-ethoxyethyl butylate in the preparation of a solid catalyst of Example 1. A solid catalyst component had a titanium content of 2.1 wt %. Next, after performing a polypropylene polymerization process by the same method as in Example 1, results of the polypropylene polymerization process are represented in Table 1

EXAMPLE 5

[Preparation of a Solid Catalyst Component]

The catalyst was prepared by sequentially injecting 3.2 g of diisobutylphthalate respectively into 2.8 g of 2-methoxyethyl butylate as an internal electron donor when preparing a solid catalyst using a spherical carrier prepared by the same method as in Example 3. A solid catalyst component had a titanium content of 2.0 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2. The average particle size was 45.2 μm.

EXAMPLE 6

[Preparation of a Solid Catalyst Component]

The catalyst was prepared by sequentially injecting 2.5 g of 2-isopentyl-2-isopropyl-1,3-dimethoxypropane respectively into 3.8 g of 2-methoxyethyl butylate as an internal electron donor when preparing a solid catalyst using a spherical carrier prepared by the same method as in Example 3. A solid catalyst component had a titanium content of 2.2 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2. The average particle size was 45.2 μm.

COMPARATIVE EXAMPLE 1

[Preparation of a Spherical Carrier]

After sufficiently ventilating a 5 L-sized glass reactor having a stirrer, an oil heater and a cooling refluxer mounted thereon with nitrogen, 7 g of N-bromosuccinimide, 60 g of metal magnesium (a powder-type product having an average particle diameter of 120 μm) and 900 ml of anhydrous ethanol were injected into the reactor, and then temperature of the reactor was maintained to 70° C. that was an ethanol reflux state while operating the reactor at a stirring rate of 250 rpm. Since hydrogen was generated while a reaction process was being started with the passage of about 5 minutes, pressure of the reactor was maintained at atmospheric pressure in a state that an outlet of the reactor was opened so as to discharge generated hydrogen. After the generation of hydrogen, an aging treatment process was performed by maintaining a reactor temperature and a stirring rate in a reflux state for 2 hours. After finishing the aging treatment process, a resulting material was washed at 50° C. three times using 2,000 ml of n-hexane per one time of a washing process. 328 g of a diethoxymagnesium carrier with a yield of 92.8% as a white powder-type solid product with good flowability was obtained by drying a washed resulting material in the presence of a flowing nitrogen for 24 hours.

As results of measuring by the same methods as in Example 1, the dried carrier suspended in n-hexane had the average particle size of 20.6 μm, the particle distribution index of 1.37, and the apparent density of 0.33 g/cc.

[Preparation of a Solid Catalyst Component]

The catalyst was prepared by using 4.7 g of diisobutylphthalate as an internal electron donor when preparing a solid catalyst of Example 1. A solid catalyst component had a titanium content of 2.2 wt %. After performing a polypropylene polymerization process by the same method as in Example 1, the results are represented in Table 1.

COMPARATIVE EXAMPLE 2

[Preparation of a Spherical Carrier and a Solid Catalyst Component]

After injecting 150 ml of toluene, 12 ml of tetrahydrofuran, 20 ml of butanol and 21 g of magnesium chloride into an 1 L-sized glass reactor which was sufficiently substituted with nitrogen, in which a stirrer was installed, increasing temperature of the reactor to 110° C., and maintaining the reactor at 110° C. for 1 hour, a homogeneous solution was obtained. After cooling temperature of the solution to 15° C., injecting 25 ml of titanium tetrachloride into the solution, increasing temperature of the reactor to 60° C. over 1 hour, performing an aging treatment process for 10 minutes, and performing a settling process for 15 minutes to settle a carrier, a supernatant of a resulting material was removed from a resulting material. After injecting 200 ml of toluene into a slurry remained in the reactor, and repeating stirring, settling, and supernatant removal processes two times, a resulting material was washed to obtain a slurry.

After injecting 150 ml of toluene into such obtained slurry, and injecting a diluted solution prepared by diluting 25 ml of titanium tetrachloride into 50 ml of toluene at 15° C. into the slurry over 1 hour, temperature of the reactor was increased to 30° C. in a rate of 0.5° C./min. After maintaining a reaction mixture at 30° C. for 1 hour, 4.5 ml of diisobutylphthalate and 3 ml of 2-isopentyl-2-isopropyl-1, 3-dimethoxypropane were injected into the reaction mixture, and temperature of the reactor was increased to 110° C. again in a rate of 0.5° C./min.

After maintaining a resulting material at 110° C. for 1 hour, lowering temperature of the resulting material to 90° C. to stop a stirring process, and performing a supernatant removal process, a resulting material was additionally washed one time by the same method using 200 ml of toluene to obtain a slurry. After injecting 150 ml of toluene and 50 ml of titanium tetrachloride into the slurry and increasing temperature of a slurry mixture to 110° C., the slurry mixture was maintained at 110° C. for 1 hour. After performing a process of aging the slurry mixture, washing an aging process-completed slurry mixture two times with 200 ml of toluene per time of the washing process, and washing the washed slurry mixture five times at 40° C. with 200 ml of hexane per time of the washing process to obtain a pale yellow solid catalyst component. A solid catalyst component obtained by drying the pale yellow solid catalyst component in flowing nitrogen for 18 hours had a titanium content of 3.3 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2.

COMPARATIVE EXAMPLE 3

[Preparation of a Solid Catalyst Component]

The catalyst was prepared using 6.5 g of 2-isopropyl-2-(3-methylbutyl)-1,3-dimethoxypropane as an internal electron donor in preparation of the solid catalyst of Example 1 using the carrier prepared in Comparative Example 1. A solid catalyst component had a titanium content of 3.0 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2.

COMPARATIVE EXAMPLE 4

[Preparation of a Solid Catalyst Component]

The catalyst was prepared using 4.8 g of 2-methoxyethyl acetate as an internal electron donor in preparation of the solid catalyst of Example 1 using the carrier prepared in Comparative Example 1. A solid catalyst component had a titanium content of 3.1 wt %. Next, after performing a polypropylene polymerization process by the same method as in Example 1, results of the polypropylene polymerization process are represented in Table 1, and after producing a propylene-based block copolymer by the same method as in Example 1, production results are represented in Table 2.

TABLE 1

|  | Catalytic activity (g-PP/g-cat 2 h) | X.I. (wt %) | MI (g/10 min) | P.I. |
|---|---|---|---|---|
| Example 1 | 73,000 | 98.9 | 65 | 4.1 |
| Example 2 | 76,000 | 98.8 | 63 | 4.2 |
| Example 3 | 81,000 | 98.8 | 71 | 4.1 |
| Example 4 | 82,000 | 98.9 | 73 | 4.1 |
| Example 5 | 78,000 | 98.8 | 660 | 4.3 |
| Example 6 | 72,000 | 99.0 | 110 | 3.9 |
| Comparative Example 1 | 65,000 | 98.7 | 13 | 4.2 |
| Comparative Example 2 | 56,000 | 98.0 | 25 | 4.0 |
| Comparative Example 3 | 53,000 | 98.5 | 125 | 3.5 |
| Comparative Example 4 | 34,000 | 96.4 | 100 | 4.3 |

TABLE 2

|  | Propylene-based copolymerization | | | |
|---|---|---|---|---|
|  | ICP activity (g-PP/g-cat) | EPR (wt %) | B-C2 (wt %) | PER-C2 (wt %) |
| Example 1 | 56,000 | 38 | 20 | 56 |
| Example 2 | 58,000 | 37 | 21 | 57 |
| Example 3 | 53,000 | 39 | 21 | 55 |
| Example 4 | 55,000 | 38 | 21 | 55 |
| Example 5 | 58,000 | 37 | 20 | 54 |
| Example 6 | 50,500 | 35 | 19 | 54 |
| Comparative Example 1 | 48,000 | 23 | 12 | 52 |
| Comparative Example 2 | 41,000 | 29 | 14 | 48 |
| Comparative Example 3 | 47,000 | 25 | 13 | 52 |
| Comparative Example 4 | 27,000 | 27 | 14 | 52 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of preparing a solid catalyst for propylene polymerization, the method comprising the steps of:
   (1) reacting dialkoxymagnesium with a metal halide compound at a reaction temperature of −10 to 60° C. in the presence of an organic solvent;
   (2) reacting two or more types of the internal electron donors with the reaction product while increasing temperature of a reaction product of the step (1) to obtain a reaction product; and
   (3) reacting the reaction product of the step (2) with a titanium halide at a reaction temperature of 60 to 150° C.,
   wherein a bulk specific gravity in the dialkoxymagnesium is 0.20 to 0.40 g/ml,
   an internal electron donor formed of a nonaromatic alkoxyester-based compound represented by the following general formula (II) as a first internal electron donor and phthalic acid ester or 1, 3-diethers as a second internal electron donor:

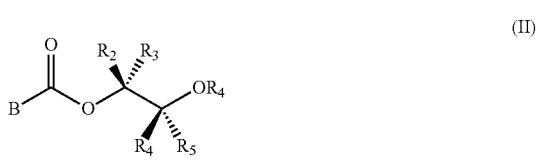

(II)

wherein, B is a compound with a mono ester structure consisting of aliphatic saturated hydrocarbons and cyclic saturated hydrocarbons having 1 to 20 carbon atoms or a compound with a carbamate structure consisting of an amino group and a linear or cyclic amino group, $R_1$ is a linear alkyl group having 1 to 12 carbon atoms, and $R_2$, $R_3$, $R_4$ and $R_5$ are each independently hydrogen, a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms, and
   wherein the dialkoxymagnesium is obtained by reacting metal magnesium with alcohol and a reaction initiator, the alcohol is divisionally added to the metal magnesium 3 to 6 times, the reaction initiator is injected into a reaction system when starting an initial reaction process, and the reaction initiator is divisionally added to the reaction system 2 to 5 times during an additional reaction process,
   stirring rate during the reaction process with the metal magnesium and alcohol is 50 to 300 rpm at a reaction temperature of 25 to 110° C.

2. The method of claim 1, wherein a ratio of the metal magnesium to alcohol is 1:5 to 1:100 as a ratio of magnesium weight (g) to alcohol volume (ml).

3. The method of claim 1, wherein the reaction initiator includes a nitrogen halogen compound, a halogen compound, or a magnesium halide.

4. The method of claim 3, wherein the nitrogen halogen compound is one selected from the group consisting of the following general formulas (1) to (4):

(1)

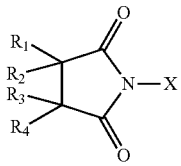

in general formula (1) which is an N-halide succinimide based compound, X is a halogen, and $R_1$, $R_2$, $R_3$ and $R_4$ are hydrogen, a $C_1$-$C_{12}$ alkyl, or a $C_6$-$C_{20}$ aryl (2)

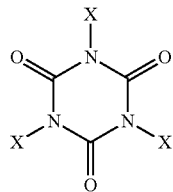

in general formula (2) which is a trihaloisocyanuric acid-based compound, X is a halogen (3)

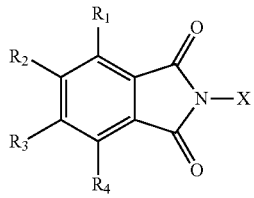

in general formula (3) which is an N-halophthalimide based compound, X is a halogen, and $R_1$, $R_2$, $R_3$ and $R_4$ are hydrogen, an $C_1$-$C_{12}$ alkyl, or a $C_6$-$C_{20}$ aryl (4)

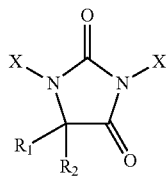

in general formula (4) which is a hydantoin-based compound, X is a halogen, and $R_1$ and $R_2$ are hydrogen, a $C_1$-$C_{12}$ alkyl, or a $C_6$-$C_{20}$ aryl.

5. The method of claim 3, wherein the halogen compound includes $Br_2$ or $I_2$, and the magnesium halide is magnesium chloride ($MgCl_2$), magnesium bromide ($MgBr_2$), or magnesium iodide ($MgI_2$).

* * * * *